United States Patent [19]
Diccianni et al.

[11] Patent Number: 5,257,957
[45] Date of Patent: Nov. 2, 1993

[54] FACILITY FOR PROVIDING A SEALED WORK AREA TO HANDLE, MANIPULATE AND FORMULATE MATERIALS

[76] Inventors: Anthony M. Diccianni, 330 Knoll Rd., Norristown, Pa. 19401; Eric A. Diccianni, 209 Lincoln Woods, Lafayette Hill, Pa. 19444

[21] Appl. No.: 962,631

[22] Filed: Oct. 16, 1992

[51] Int. Cl.$^5$ ............................................. B08B 15/02
[52] U.S. Cl. ......................................... 454/57; 312/1; 454/56
[58] Field of Search ................. 312/1; 454/49, 50, 51, 454/52, 56, 57

[56] References Cited

U.S. PATENT DOCUMENTS

| | | | |
|---|---|---|---|
| 3,410,619 | 11/1968 | Delnay et al. | 312/1 |
| 3,496,856 | 2/1970 | Wiggins | 454/50 |
| 4,069,913 | 1/1978 | Harrigan | 312/1 X |
| 4,111,753 | 9/1978 | Folsom et al. | 312/1 X |
| 5,095,925 | 3/1992 | Elledge et al. | 312/1 X |

FOREIGN PATENT DOCUMENTS

| | | | |
|---|---|---|---|
| 459492 | 12/1991 | European Pat. Off. | 454/49 |
| 2053447 | 4/1971 | France | 312/1 |
| 105700 | 8/1979 | Japan | 312/1 |

Primary Examiner—Harold Joyce
Attorney, Agent, or Firm—Panitch Schwarze Jacobs & Nadel

[57] ABSTRACT

A facility for providing a sealed work area to handle, manipulate and formulate materials which includes a walled enclosure having an interior periphery defining a work area. The enclosure includes an inlet port for allowing air to flow into the enclosure work area and an outlet port for allowing air to flow out of the enclosure work area. A replaceable liner is positioned within the enclosure work area in facing relationship with the interior periphery to further define the enclosure work area. The liner includes an inlet aperture in complementary sealed engagement with the inlet port and an outlet aperture in complementary sealed engagement with the outlet port. The liner is readily removable from the work area to be replaced with a second liner to facilitate decontamination of the work area. A blower causes air to flow through the inlet port into the enclosure work area and out of the enclosure work area through the outlet port.

16 Claims, 3 Drawing Sheets

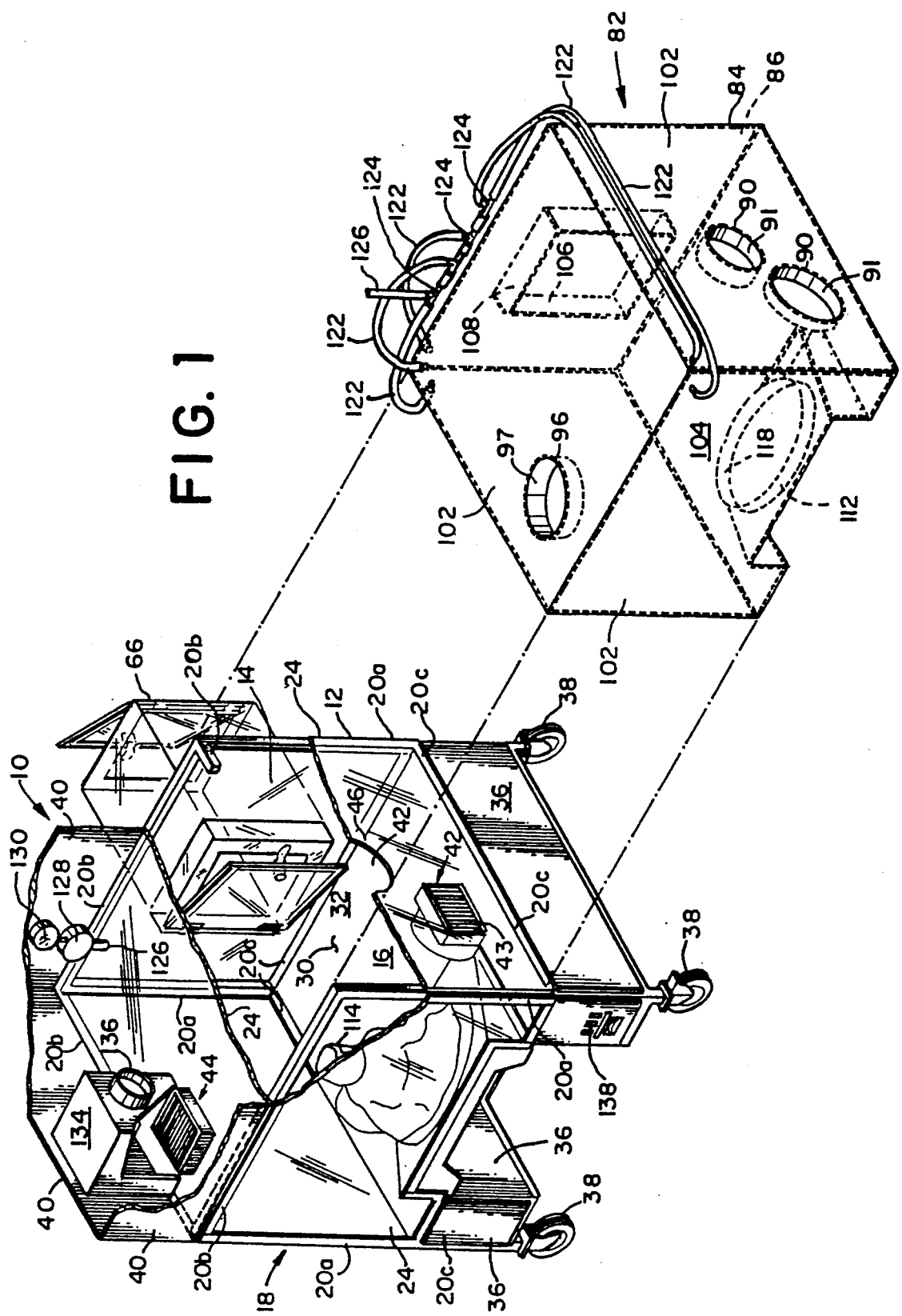

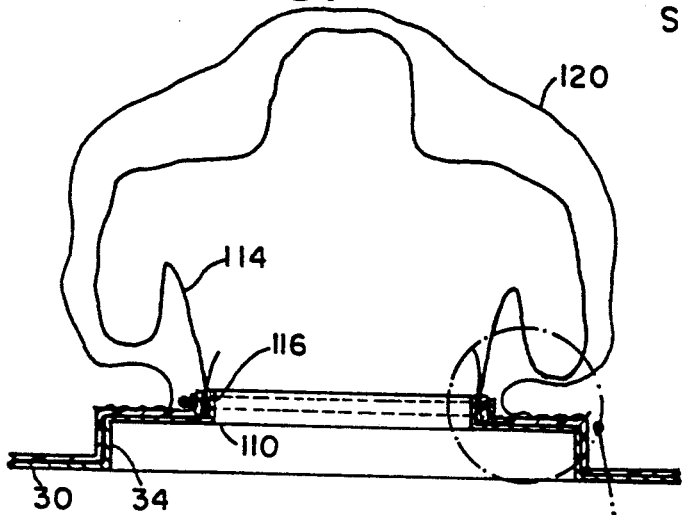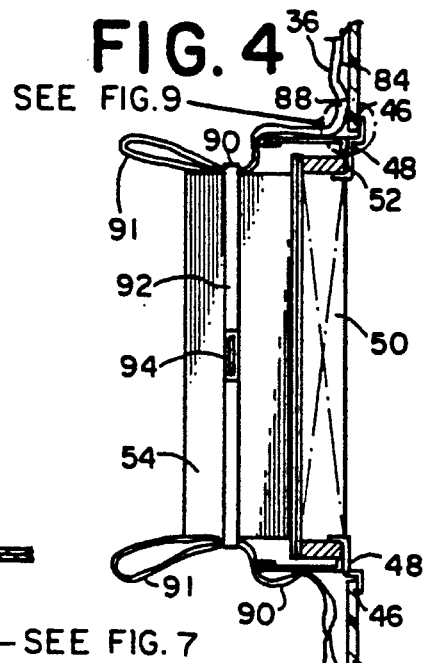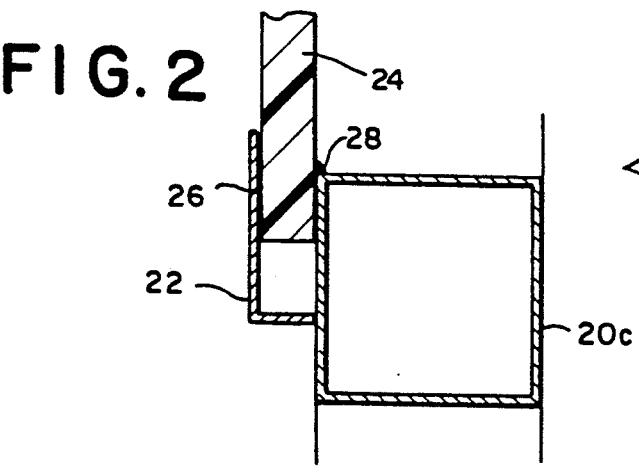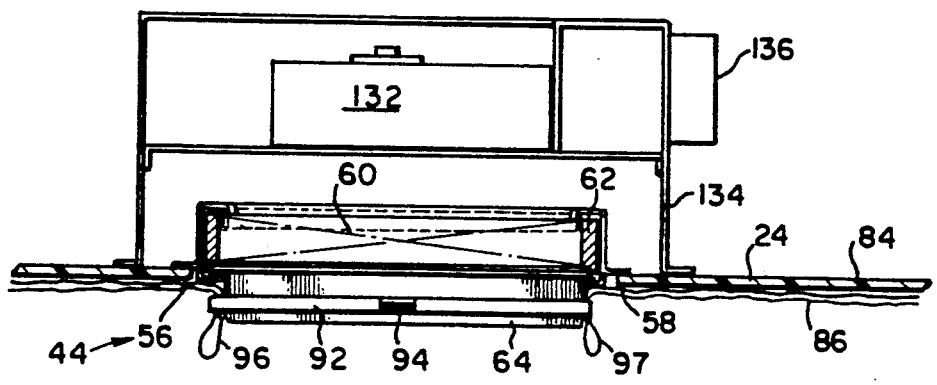

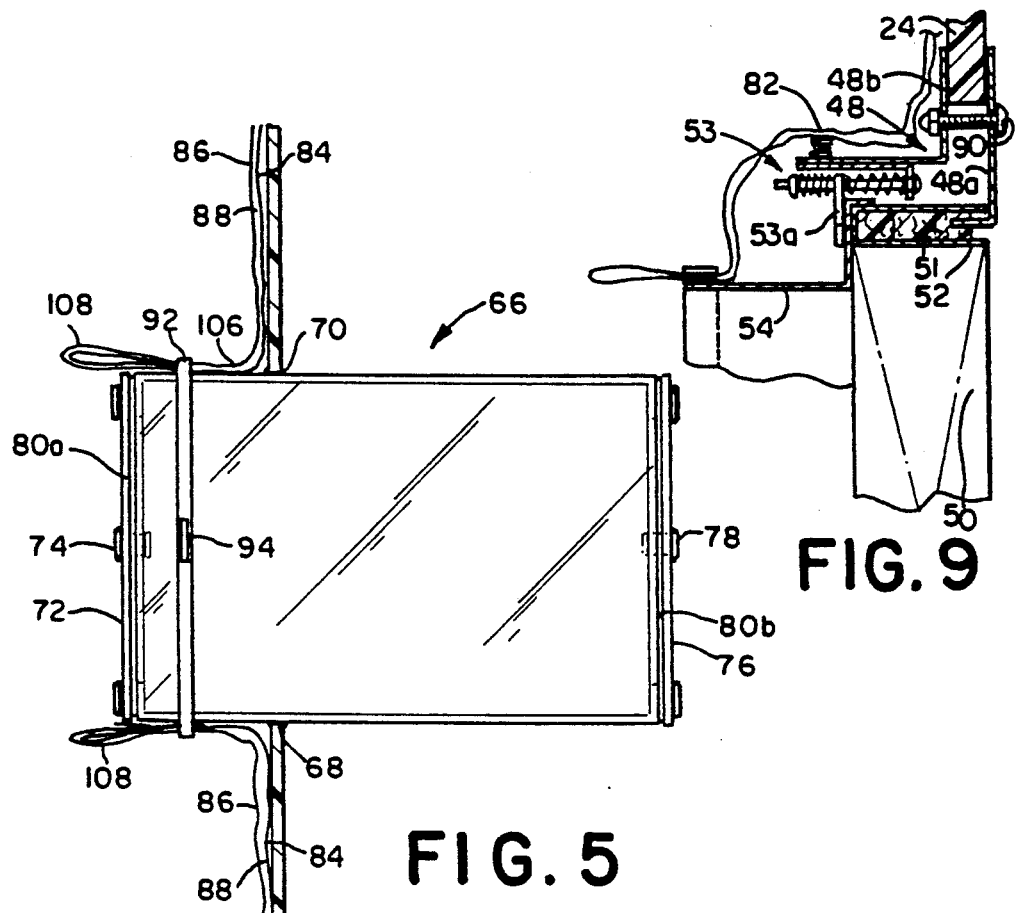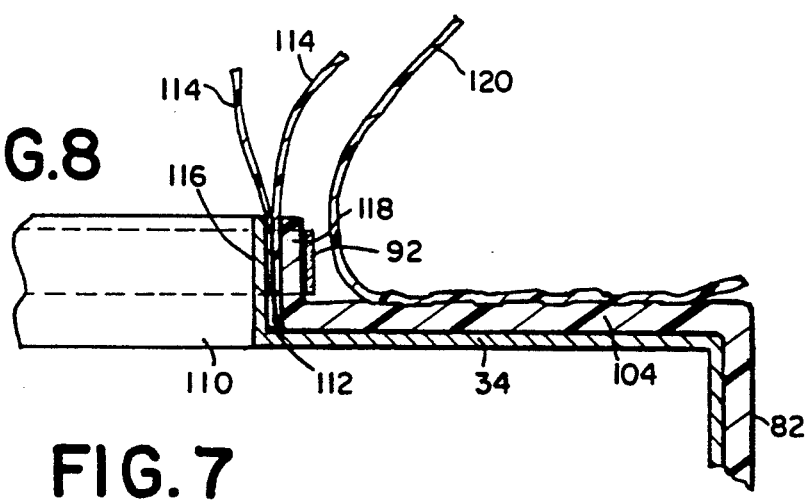

FACILITY FOR PROVIDING A SEALED WORK AREA TO HANDLE, MANIPULATE AND FORMULATE MATERIALS

FIELD OF THE INVENTION

The present invention relates to a facility for providing a sealed work area to handle, manipulate and formulate materials, and more particularly, to a negative pressure facility having a removable liner for avoiding the clean-up and decontamination of the work area within the facility.

BACKGROUND OF THE INVENTION

In the handling, manipulating and formulating of hazardous or toxic materials, it is known to employ a glove box or other type of sealed enclosure to prevent the operator from being exposed to the materials. The operator performs various tasks though glove ports to thereby biologically remove the operator from the hazardous or toxic environment within the sealed enclosure. In relatively large sealed enclosures, the operator uses a protective upper torso suit.

While the foregoing provides adequate protection for the operator, the problem of clean-up of the work area within the enclosure remains a hazardous, laborious and extremely time consuming and expensive task. Moreover, although precautions are taken in the clean-up procedures, the possibility exists that complete clean-up is not accomplished.

Conventional clean-up and decontamination procedures create significant down time in the field of handling hazardous or toxic compounds. For example, it has been known to sterilize containment or isolation units by applying a bleach or periodic acid to the interior surfaces of the unit. However, the use of bleach is problematic in that it is difficult to break down once it is applied to the interior of the unit. Similarly, the use of periodic acid is also problematic in that it is caustic and, therefore, places the safety of the cleaning personnel at risk. The most recent method of decontaminating a containment or isolation unit comprises applying hydrogen peroxide to the interior of the unit. This method is more acceptable in that it readily breaks down to water and is not caustic. However, all of the foregoing methods require a significant period of time to apply the solution to the interior of the unit and dry the interior of the unit. All of the above methods are further problematic in that they may not reach each crevice or minutely exposed interior surface of the unit during the clean-up process.

Other attempts to create isolation units which do require decontamination by a liquid process have not proved to be cost effective. For instance, one known isolation system utilizes a tubular frame having a polyvinyl chloride enclosure canopy hanging therefrom. The canopy includes one or more glove portals and is sealingly connected to inlet and outlet filters as well as access doors. The cost of the this system has proved to be prohibitive because of the complex structure of the canopy.

The present invention overcomes many of the disadvantages inherent in the above-described container or isolation units and methods of decontaminating the same, by providing a walled enclosure having a replaceable, disposable liner positioned therein in sealed engagement therewith. In this manner, the enclosure can be cleaned and decontaminated by merely collapsing the liner, removing and disposing of the same. A second or new liner can then be quickly positioned within the enclosure to carry out additional handling of hazardous or toxic materials. Thus, the present invention comprises a facility which can be readily decontaminated and sterilized in a relatively short amount of time without exposing personnel to hazardous materials. Use of the present invention results in a considerable savings in money as well as time for the decontamination and sterilization of a facility for handling, manipulating and formulating materials in a sealed work area.

SUMMARY OF THE INVENTION

Briefly stated, the present invention, comprises a facility for providing a sealed work area to handle, manipulate and formulate materials. The facility includes a walled enclosure having an interior periphery defining a work area. The enclosure includes an inlet port for allowing air to flow into the enclosure work area and an outlet port for allowing air to flow out of the enclosure work area. A replaceable liner is positioned within the enclosure work area in facing relationship with the interior periphery to further define the enclosure work area. The liner includes an inlet aperture in complementary sealed engagement with the inlet port and an outlet aperture in complementary sealed engagement with the outlet port. The liner is readily removable from the work area to thereby be replaced with a second liner to facilitate decontamination of the work area. Flow control means is provided for causing air to flow through the inlet port into the enclosure work area and out of the enclosure work area through the outlet port.

The present invention further comprises a replaceable liner having a first flexible wall configured to generally complement the interior periphery of the enclosure work area. A second flexible wall is positioned inwardly of the first wall and is in sealed engagement therewith to define an inflatable cavity therebetween. The first and second walls include an inlet aperture for being placed in complementary sealed engagement with the inlet port and an outlet aperture for being placed in complementary sealed engagement with the outlet port. The liner further includes valve means for selectively allowing a gas to pass to and from the cavity. The liner has a first configuration wherein a first volume of gas is positioned within the cavity to thereby inflate the liner to an expanded position which complements the interior periphery of the enclosure work area. The liner has a second configuration wherein a second volume of gas is positioned within the cavity such that the liner is substantially deflated to a collapsed position which permits the liner to be removed from the enclosure work area through a port in the enclosure.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred. It being understood, however that the invention is not limited to the specific methods and instrumentalities disclosed. In the drawings:

FIG. 1 is an exploded, partially broken away, perspective view of a facility in accordance with the present invention;

FIG. 2 is a greatly enlarged cross-sectional view of a portion of the enclosure assembly frame of the facility of FIG. 1;

FIG. 3 is a greatly enlarged cross-sectional view of an outlet of the facility of FIG. 1;

FIG. 4 is a greatly enlarged cross-sectional view of an inlet of the facility of FIG. 1;

FIG. 5 is a greatly enlarged cross-sectional view of a device for accessing the interior of the facility of FIG. 1;

FIG. 6 is a cross-sectional of a portion of the facility of FIG. 1 showing the worker access port and aperture and a liner in accordance with an alternate embodiment of the invention;

FIG. 7 is a greatly enlarged fragmentary view of a portion of the worker access port and aperture shown in FIG. 6;

FIG. 8 is a greatly enlarged fragmentary view of a portion of the liner shown in FIG. 4; and FIG. 9 is a greatly enlarged fragmentary view of the filter, liner and inlet port connection shown in FIG. 4.

DESCRIPTION OF PREFERRED EMBODIMENT

Certain terminology is used in the following description for convenience only and is not limiting. The words "right", "left", "lower" and "upper" designate directions in the drawings to which reference is made. The words "inwardly" and "outwardly" refer to directions towards and away from, respectively, the geometric center of the facility and designated parts thereof. The terminology includes the words above specifically mentioned, derivatives thereof and words of similar import.

Referring to the drawings, wherein like numerals indicate like elements throughout, there is shown in FIG. 1 a perspective view of a facility 10 for providing a sealed work area to handle, manipulate and formulate materials (not shown). The facility 10 comprises a walled enclosure 12 having an interior periphery 14 defining a work area 16. The enclosure 12 consists of a frame 18 of tubular members 20a, 20b, 20c which are assembled together to provide a generally rigid structure by a combination of welding and bolting the tubular members 20a, 20b, 20c generally in the form of a parallelpiped.

As shown in FIG. 2, in the present embodiment, it is preferred that the tubular members 20a, 20b, 20c be generally square stainless steel tubes for providing the enclosure 12 with structural integrity. However, it is understood by those skilled in the art that the tubular members 20a, 20b, 20c can be formed in any configuration, or constructed of other materials, such as generally rectangular aluminum tubing, without departing from the spirit and scope of the invention. Similarly, the tubular members 20a, 20b, 20c can be secured together by other methods, such as by interlocking tabs and standard fasteners.

Each of the tubular members 20a, 20b, 20c includes one or two inwardly extending, generally L-shaped flanges 22, each for receiving a panel 24 in an airtight manner. In the present embodiment, it is preferred that the vertically extending tubular members 20a and the upper horizontal tubular members 20b include a pair of flanges 22, each for receiving a panel 24 in an airtight manner. Similarly, it is preferred that the lower tubular members 20c include a single L-shaped flange 22 for receiving a single panel 24, as is apparent from the enclosure 12 shown in FIG. 1. A seal is formed between the adjoining surfaces of each panel 24 and its corresponding flange 22 and tubular member 20a, 20b, 20c by a sealing gasket 26 and a bead seal 28 to ensure absolute leak-tight joints between the surfaces of the panels 24 and the tubular members 20a, 20b, 20c.

Referring now to FIG. 1, it is preferred that four panels 24 extend between the vertically extending tubular members 20a to form the side walls of the enclosure 12 and a single panel 24 extend between the upper tubular members 20b to form the ceiling of the enclosure 12. In the present embodiment, it is preferred that the panels be constructed of a generally rigid transparent material for providing the enclosure 12 with a degree of structural integrity and to allow observation of the interior of the enclosure 12. In the present embodiment, it is preferred that the panels 24 be constructed of a rigid acrylic, however, it is understood by those skilled in the art that other materials could be used to construct the panels 24, such as plexiglass, glass, or other transparent, generally rigid materials. While it is preferred that the panels 24 be generally transparent to permit viewing of the interior of the enclosure 12 without having to incorporate a lighting system within the enclosure 12, it is understood by those skilled in the art that the panels 24 could have a degree of opacity and that the enclosure 12 could include an internal lighting system (not shown).

Extending between the lower tubular members 20c is a working panel 30 for providing a work surface 32. The working panel 30 is preferably constructed of a high strength, lightweight metallic material, such as stainless steel, and is preferably welded to each of the lower tubular members 20c. However, it is understood by those skilled in the art that the working panel 30 could be constructed of other high-strength, lightweight materials, such as aluminum or polyvinyl chloride, without departing from the spirit and scope of the invention. The working panel 30 includes a pulpit area 34 for allowing access to the work area 16, as described in more detail hereinafter.

As shown in FIG. 1, the lower tubular members 20c include a series of lower courtesy panels 36 extending downwardly therefrom to provide the enclosure 12 with an overall aesthetically pleasing appearance and to mount the control elements of the facility 10, described hereinafter. Positioned at the bottom of each of the vertically extending members 20a is a wheel 38 for providing the enclosure 12 with a degree of portability. Similarly, extending upwardly from the upper tubular members 20b are a series of upper courtesy panels 40. The upper courtesy panels 40 place the instrumentation and other elements of the enclosure 12, described hereinafter, which are located above the ceiling panel 24 out of view. Although the upper courtesy panels 40 are only partially shown, it is understood by those skilled in the art, that the upper courtesy panels 40 extend completely around the perimeter of the enclosure 12.

Referring now to FIGS. 1 and 4, the enclosure 12 includes a pair (only one is fully shown) of inlet ports 42 for allowing air to flow into the enclosure work area 16 and an outlet port 44 for allowing air to flow out of the enclosure work area 16. In the present embodiment, it is preferred that each inlet port 42 be formed in one of the side wall panels 24 and the outlet port be formed in the ceiling panel 24, as described in more detail hereinafter. As best shown in FIG. 4, each inlet port 42 is formed by an aperture 46 formed in the panel 24. Referring now to FIG. 9, a bracket 48 is sealingly secured to the aperture 46 such that air cannot pass between the bracket 48 and panel 24.

The bracket is formed by first and second L-shaped members 48a, 48b which receive the panel 24 therebetween. A standard fastener, such as a nut and bolt 49, clamps the panel 24 between the first and second L-shaped members 48a, 48b. The bracket 48 receives a high efficiency particulate air (HEPA) filter 50 for filtering air flowing through the inlet port 42. The filter 50 is comprised of a frame 52 which is sealingly secured to the first L-shaped member 48a of the bracket 48 from within the enclosure 12 by a gel seal 51 and a series (e.g., four) of quarter turn fasteners 53 (only one is shown) disposed about the periphery of the second L-shaped member 48b of the bracket 48.

Each quarter turn fastener includes a pawl 53a which is pivotable inwardly into engagement with the back of the frame 52 to prevent the filter 50 from being removed from the first L-shaped member 48a. Similarly, each pawl 53a is pivotable outwardly to allow the filter 50 to be removed from the first L-shaped member 48a, as described in more detail hereinafter. Extending inwardly from the frame 52 is a generally circular flange 54. The purpose of the flange 54 is described in more detail hereinafter. If desired, a louvered cover 43 can be positioned over the aperture 46 on the exterior side of the panel 24 to protect the filter 50 from accidental damage.

The present invention is not limited to the particular manner in which the bracket 48 is secured to the aperture 46 and filter 50. Therefore, it is understood by those skilled in the art that other methods could be used to secure the bracket 48 to the aperture 46 and filter 50. For instance, the aperture 46, bracket 48 and filter 50 could be snap-fit together without departing from the spirit and scope of the invention. However, it is preferred that the filter 50 be mounted from within the enclosure 12, for reasons described hereinafter.

It is understood by those skilled in the art that the inlet ports 42 are generally identical. Therefore, the foregoing description of the inlet port 42 in connection with FIGS. 4 and 9 is equally applicable to both inlet ports 42. Similarly, it is understood by those skilled in the art that the present invention is not limited to any particular number of inlet ports. That is, the enclosure 12 could include a single inlet port 42 or three or more inlet ports 42, without departing from the spirit and scope of the invention. Similarly, the location of the inlet ports 42 is not pertinent to the present invention and they may be located anywhere in the enclosure 12 as long as a sufficient flow of air is available.

Referring now to FIGS. 1 and 3, the outlet port 44 is comprised of an aperture 56 in the ceiling panel 24. A bracket 58 complements the aperture 56 and is in sealed engagement therewith. The bracket receives a HEPA filter 60 in a sealed manner. Preferably, the HEPA filter 60 is secured to the bracket 58 from within the enclosure 12 by a gel seal (not shown), as is understood by those skilled in the art. The HEPA filter 60 includes a frame 62 which is secured to the bracket 58. Extending inwardly from the frame 62 is a generally circular flange 64, the use of which is described hereinafter in more detail. The outlet port 44 may also include a louvered cover 43 to protect the filter 60. The inlet ports 42 are generally identical to the outlet port 44 and, therefore, the foregoing description of the inlet ports 42 is equally applicable to the outlet port 44. Accordingly, further description of the outlet port 44 is omitted for purposes of convenience only and is not limiting.

While in the present embodiment it is preferred that the facility 10 include a single outlet port 44 located within the ceiling panel 24, it is understood by those skilled in the art that any number of outlet ports 44 could be utilized in any of the panels 24 without departing from the spirit and scope of the invention. Similarly, it is understood by those skilled in the art that the present invention is not limited to the use of a HEPA filter in the inlet and outlet ports 42, 44. For instance, other types of filters, such as a ULPAORANY efficiency air filter, could be utilized without departing from the spirit and scope of the invention.

Referring now to FIGS. 1 and 5, there is shown a double-door pass through box 66 for permitting materials to be passed through to the work area 16. The pass through box 66 is generally formed in the shape of a parallelpiped and is positioned through a complementary aperture 68 in one of the panels 24. It is preferred that a bead seal 70 be provided around the outer perimeter of the pass through box 66 along the aperture 68 to prevent air from passing therebetween. The pass through box 66 is preferably positioned partially through the panel 24 to provide a flange-like surface on the inner side of the panel 24, for the reasons described hereinafter. The portion of the pass through box 66 positioned within the enclosure 12 includes a inner hinged door 72 having a latch handle 74 positioned within the interior of the pass through box 66 for allowing the inner door 72 to be secured in a closed position from the inside of the enclosure 12, as shown in FIG. 5. Similarly, positioned outwardly of the enclosure 12 is an outer hinged door 76 having a door latch handle 78 for allowing the outer door 76 to be secured in a closed position from the outside of the enclosure 12. A first gasket 80a is disposed between the inner door 72 and the exterior surface of the pass through box 66 and a second gasket 80b is disposed between the outer door 76 and the exterior surface of the pass through box 66 for providing a tight seal therebetween when the inner and outer doors 72, 76 are in a closed position.

In the present embodiment, it is preferred that the pass through box 66 be constructed of the same material as the panels 24. However, it is understood by those skilled in the art that the pass through box 66 could be constructed of other materials, such as stainless steel, and can be constructed in other configurations, such as generally cylindrical, without departing from the spirit and scope of the invention. Pass through boxes are well understood by those skilled in the art and, therefore, further description thereof is omitted for purposes of convenience only and is not limiting.

Referring now to FIGS. 1, 3-5, and 8, a replaceable liner 82 is positioned within the enclosure work area 16 in facing relationship with the interior periphery 14 to further define the enclosure work area 16. The liner 82 is comprised of a first flexible wall 84 configured to generally complement the interior periphery 14 of the enclosure work area 16. A second flexible wall 86 which is also generally configured to complement the interior periphery of the wall area 16 is positioned inwardly of the first wall 84 and is slightly smaller and in sealed engagement therewith to define a generally small inflatable cavity 88 therebetween, as best shown in FIG. 8.

Referring now to FIGS. 1 and 4, the liner 82 includes a pair of inlet apertures 90 located so that when the liner 82 is installed, the inlet apertures 90 are in corresponding complementary sealed engagement with the pair of inlet ports 42. More particularly, when the liner 82 is installed, each inlet aperture 90 is in complementary sealed engagement with the inwardly extending flange 54 of the frame 52 of the inlet HEPA filter 50. Each inlet aperture 90 includes a collar 91 extending inwardly therefrom in facing engagement with the flange 54 of the frame 52 to permit air to flow through the filters 50 of the inlet ports 42 into the enclosure work area 16.

As shown in FIG. 4, in the present embodiment, it is preferred that the facility 10 include quick-connect means for quickly connecting and disconnecting in sealed engagement the inlet apertures 90 and the inlet ports 42. In the present embodiment, it is preferred that the quick-connect means be comprised of a generally circular band 92 having a buckle 94 for clamping the band 92 about each flange 54 with the collar 91 disposed therebetween to thereby prevent air from passing between the collar 91 and the flange 54. The buckle 94 is a standard length reducing element for reducing the overall length of the band 92 to constrict the same about the flange 54. While in the present embodiment, it is preferred that a buckle 94 be used to adjust the length of the band 92, it is understood by those skilled in the art that other devices could be used to adjust the overall length of the band 92. For instance, a screw-type hose clamp connection could be used. In addition, the flange 54 could include a complementary groove (not shown) for receiving the band 92 to thereby enhance the seal are between the collar 91 and the flange 54.

While in the present embodiment it is preferred that the quick-connect means be comprised of a generally circular band 92 having a length adjusting buckle 94, it is understood by those skilled in the art that other means could be utilized to quickly connect and disconnect the collar 91 and flange 54. For instance, a generally annular-shaped ring could be used to fit over the inner edge of the flange 54 with the collar 91 interposed therebetween (not shown). Similarly, it is also understood by those skilled in the art that the inlet aperture 90 could be secured to the inlet port 42 in other manners. For instance, the inlet aperture 90 could be clamped between the frame 52 and the bracket 48 (not shown), without departing from the spirit and scope of the invention. Accordingly, the present invention is not limited to any particular method of securing the liner inlet aperture 90 to the inlet port 42.

Referring now to FIGS. 1 and 3, the liner 82 includes an outlet aperture 96 located so that when the liner 82 is installed, the outlet aperture 90 is in complementary sealed engagement with the outlet port 44. That is, the outlet aperture 96 includes a collar 97 which, when the liner 82 is installed, is in complementary sealed engagement with the inwardly extending flange 64 of the HEPA filter 60 in a manner similar to that described above in connection with the inlet apertures 90 and inlet ports 42. Similarly, a quick-connect means is provided for quickly connecting and disconnecting in sealed engagement the liner outlet aperture 96 and the outlet port 44. In the present embodiment, it is preferred that the quick-connect means be generally identical to the band 92 and buckle 94 described above in connection with the inlet aperture 90 and inlet port 42.

Referring now to FIGS. 1 and 5, the liner 82 further includes a pass through box aperture 106 having a collar 108 extending inwardly therefrom and located so that when the liner 82 is installed, the aperture 106 complementarily receives the portion of the pass through box 66 positioned inwardly of the panel 24. As with the inlet and outlet ports 42, 44, the pass through box aperture 106, when the liner 82 is installed, is preferably in complementary sealed engagement with the collar 108. In the present embodiment, it is preferred that quick-connect means for quickly connecting and disconnecting in sealed engagement the pass through box aperture 106 and collar 108 to the portion of the pass through box 66 within the enclosure work area 16 be employed. In the present embodiment, it is preferred that the quick-connect means be generally identical to the quick-connect means used in connection with the inlet and outlet ports 42, 44, described above. That is, a band 92 having a buckle 94 for adjusting the length of the band 92.

Referring now to FIGS. 1, 6 and 7 the enclosure 12 and liner 82 include worker access means for allowing a portion of a worker (not shown) to access the enclosure work area 16. In the present embodiment, the worker access means comprises a worker access port 110 in the enclosure 12 and a worker access aperture 112 in the liner 82 in complementary sealed engagement with the worker access port 110 for allowing the portion of the worker to access the enclosure work area 16 through the worker access port 110 and aperture 112. The liner 82 is installed and removable from the enclosure work area 16 through the worker access port 110 and aperture 112, as described in more detail hereinafter.

More particularly, the worker access port 110 is located in the pulpit 34 of the bottom panel 30 and the worker access aperture 112 is located in the bottom wall 104 of the liner 82 in a position which complements the worker access port 110 in the enclosure 12 when the liner 82 is installed. In the present embodiment, the worker access means further comprises suit means positioned within the work area 16 in sealed engagement with the worker access port 110 and aperture 112 for permitting a worker to access the work area 16 without being exposed to the materials (not shown). In the present embodiment, the suit means is comprised of an upper-torso protective suit 114, as is understood by those skilled in the art. The suit 114 preferably includes an umbilical-fed air system with a dual inlet manifold (not shown) which provides charcoal-filtered air to the worker in conjunction with inflating the suit 114. The suit 114 is positioned over and around a flange 116 extending upwardly from the worker access port 110 and is positioned between a collar 118 extending upwardly from the worker access aperture 112 and the flange 116.

Quick-connect means is provided for quickly connecting and disconnecting in sealed engagement the flange 116 of the worker access port 110, the collar 118 of the worker access aperture 112 and the suit 114 to thereby prevent air from passing between the same. In the present embodiment, it is preferred that the quick-connect means be generally identical to the quick-connect means used in connection with the inlet and outlet ports 42, 44, as described above. That is, a band 92 having a buckle 94 for adjusting the length of the band 92.

Referring now to FIGS. 6 and 7, the liner 82 may include a secondary liner 120 positioned over the suit 114 in sealed engagement with the bottom wall 104 of the liner 82 to prevent the suit 114 from being exposed to the enclosure work area 16. In the present embodiment, the secondary liner 120 is generally shaped to complement the shape of the suit 114 and extends across the pulpit 34 in heat-sealed engagement with the bottom wall 104 of the liner 82. The purpose of the secondary liner 120 is to avoid having to decontaminate the exposed areas of the suit 114 after the liner 82 is removed from the enclosure 12. It is understood by those skilled in the art that the secondary liner 120 is not necessary to the present invention and that the liner 82 is sufficient for most purposes.

In the present embodiment, it is preferred that the liner 82 be constructed of a flexible clear or slightly opaque polymeric material, such as vinyl. However, it is understood by those skilled in the art that the liner 82 could be constructed of other similar materials, without departing from the spirit and scope of the invention. It is preferred that the liner 82 be formed by a heat seal process. However, it is understood by those skilled in the art that other processes could be used to form the liner 82 without departing from the spirit and scope of the invention, such as by mechanical fastening.

Referring now to FIG. 1, in the present embodiment, the liner 82, along with the filters 50, 60, frames 52, 62 and flanges 54, 64, is readily removable from the work area 16 to be replaced with a second liner (not shown), which is generally identical to the liner 82 shown in FIG. 1, to facilitate decontamination of the work area 16, as described in more detail hereinafter. The liner 82 includes valve means for selectively allowing a fluid, such as air, to pass into the cavity 88 whereby the liner 82 has a first configuration (shown in FIG. 1) wherein a first volume of fluid is positioned within the cavity 88 to thereby inflate the liner 82 to an expanded position which complements the interior periphery 14 of the enclosure work area 16. The valve means also allows a fluid, such as air, to pass from the cavity 88 whereby the liner 82 has a second configuration (not shown) wherein a second volume of fluid, such as air, is positioned within the cavity 88 such that the liner 82 is substantially deflated to a collapsed position which permits the liner 82 to be removed from the enclosure work area 16 through one of the inlet/outlet ports 42, 44 and inlet/outlet apertures 92, 96 or other ports and/or apertures in the facility 10, described above.

In the present embodiment, it is preferred that the liner 82 be generally shaped in the form of a parallelpiped to complement the interior periphery 14 of the work area 16. More particularly, the liner 82 is comprised of five separately inflatable cells 102 which correspond to the sidewalls of the liner 82 and the ceiling wall therefor. The bottom wall 104 of the liner 82 is preferably single-walled, as shown in FIG. 7. Although, it is understood by those skilled in the art that the bottom wall 104 could similarly be double-walled to permit inflation thereof.

Referring now to FIG. 1, in the present embodiment, the valve means is comprised of a series of flexible tubes 122 which are in fluid communication with each of the cells 102. The flexible tubes 122 are connected by T-shaped connectors to thereby place each cell 102 in fluid communication with a single inflation tube 126. The inflation tube 126 is fluidly connected to an inlet valve 128 and pressure gauge 130 for indicating the inflation pressure of the liner 82. The inlet valve 128 and pressure gauge 130 extend from the ceiling panel 24 and are viewable through an appropriately sized aperture (not shown) in the courtesy panel 40.

While in the present embodiment, it is preferred that the valve means be comprised of a series of flexible tubes 122 which are in fluid communication with a single inflation tube 126, it is understood by those skilled in the art that other valving could be used to inflate the liner 82. For instance, each of the cells 102 could be in fluid communication with each other to thereby permit a single flexible tube to inflate the liner 82. In the present embodiment, it is preferred that the flexible tubes be TYGON tubing as is well understood by those skilled in the art, although other flexible tubing could be used without departing from the spirit and scope of the invention. The valve means could also include a pressure regulator valve (not shown) to automatically control the air pressure within the cavity 88.

Referring now to FIGS. 1 and 3, the facility 10 further includes flow control means for causing air to flow through the inlet ports 42 into the enclosure work area 16 and out of the enclosure work area 16 through the outlet port 44. In the present embodiment, the flow control means is comprised of a motor driven suction blower 132 positioned within a housing 134 above the outlet port 44. The housing 134 preferably surrounds the outlet port 44 in sealed engagement with the panel 24 to thereby provide the greatest efficiency for withdrawing air from the enclosure work area 16. The housing 134 includes an exhaust port 136 for allowing the air to escape from the housing 134. The suction blower 132 has sufficient power to create a negative pressure within the enclosure work area 16 even with the two inlet ports 42 to prevent the accidental escape of fumes, etc. from the work area. As such, it is necessary that the liner 82 have a degree of rigidity to prevent the same from collapsing due to the negative pressure. The inflatable cavity 88 provides the necessary rigidity to enable the present invention to function.

The motor drive suction blower 132 is controlled by one or more power switches 138 mounted on the lower courtesy panel 36. Standard circuitry (not shown) is interposed between the motor driven suction blower 132 and the control switches 138, as is understood by those skilled in the art. Accordingly, further description of the control circuitry of the present invention is omitted for purposes of convenience only and is not limiting.

While in the present embodiment, it is preferred that the flow control means be comprised of a suction blower 132 at the outlet port 44, it is understood by those skilled in the art that the present invention is not limited to negative pressure facilities. That is, a fan could be located at the inlet port 42 to thereby create a positive or equal pressure facility which does not handle toxic or hazardous materials without departing from the spirit and scope of the invention. In the event that the facility 10 is positively pressurized, it would not be necessary to use a double-walled inflatable liner 82 because the requisite rigidity would not be required. As such, in the event that the facility 10 is positively pressurized, a single-walled liner 82 could be utilized without departing from the spirit and scope of the invention.

To line the facility 10 with the liner 82, the worker positions himself or herself through worker access port 10 and worker aperture 112 without the suit 114. The appropriate number of filters 50, 60 and flanges 54, 64 are placed within the facility 10 by the worker. The worker then secures the gel seal 51 of each filter 50, 60 to the first L-shaped member 48a of each bracket 48. Each quarter turn fastener 53 is then rotated such that the pawl 53a is in engagement with the frame 52, 62 of each filter 50, 60 to thereby secure each filter 50, 60 in place.

With the liner 82 in the deflated or second configuration, it is passed through one of the ports of the enclosure 12 into the enclosure work area 16. In the present embodiment, it is preferred that the liner 82 be passed through the worker access port 110, since it is the largest of the ports and thereby will enable the liner 82 to be readily passed therethrough. The inflation tube 126 is then placed in fluid communication with the inlet valve 128 and a gas is introduced into the cavity 88 of the liner 82 to inflate the liner 82 to an expanded or first configuration which complements the interior periphery 14 of the enclosure work area 16. At this point, the liner 82 is generally in complementary engagement with the interior periphery 14 of the enclosure 12.

The worker then exits the facility 10 and collects the appropriate number of bands 92 for securing the collars 91, 97, 108 to the flanges 54, 64 and pass through box 66. The worker then reenters the facility 10 through the worker access port 110 and worker aperture 112 and secures a band 92 about each of the appropriate flanges 54, 64 and pass through box 66. The suit 114 is then placed into the facility 10 through the worker access port 110 and worker aperture 112 and is connected to its air supply (not shown) outside the facility 10. The worker then gets in the suit 114 and secures a band 92 about the flange 116, suit 114 and collar 118 whereupon the system is ready for operation.

If the liner 82 includes the secondary liner 120, it is necessary that the appropriate number of bands for the inlet port 42, outlet port 44 and pass through box 66 be placed within the liner 82 prior to positioning the liner 82 in the facility 10. It is also necessary for the worker to position himself through the worker access port 110 and worker aperture 110 with a band in hand for securing the suit 114 and collar 118 to the flange 116.

At some point prior to installing the liner 82 within the facility 10, an appropriate number of polyvinyl chloride flexible or rigid close off panels (not shown) are placed within the liner 82 for use in removing the liner 82 from the enclosure work area 16, as described in more detail hereinafter. The close off panels are preferably shaped to complement the flanges 54, 64 with a friction fit to prevent air or other particles from passing through the inlet ports 42 and outlet port 44.

To operate, the blower 132 is actuated to cause a negative pressure within the facility 10. The hazardous material is then passed into the enclosure work area 116 through the pass through box 66, as is understood by those skilled in the art. The worker can then handle and manipulate the material until the process is completed. Once the process is completed and it is necessary to handle a different material and/or decontaminate the facility 10, the liner 82 is removed from the enclosure work area 16 to decontaminate the work area 16 after the process has been carried out therein.

To remove the liner 82 from the enclosure work area 16, each close off panel is positioned in complementary sealed friction engagement with the flanges 54, 64 to prevent penetration of ambient air through the inlet ports 42 and outlet port 44. The inlet valve 128 is then opened to allow the gas to pass from the cavity 88 to substantially deflate the liner 82 to a collapsed position. Once the liner 82 has collapsed, the quarter turn fasteners 53 are then rotated such that the pawls 53a are pivoted away from the frame 52, 62 of each filter 50, 60. Each flange 54, 64 and filter 50, 60 is moved inwardly away from the first L-shaped member 48a of the bracket 48 until the filters 50, 60 are positioned sufficiently within the enclosure work area 16 to permit the liner 82 to be inverted, wrapped and tied off around each filter 50, 60 such that each filter 50, 60 becomes bagged within the liner 82. Similarly, the liner 82 is tied off about the other collars 108 and 118 to prevent air from passing therethrough. Once the liner 82 has collapsed and has been detached from the various ports, it is removed from the enclosure work area 16 through one of the ports in the enclosure 12. For instance, the liner 82 can be passed through the worker access port 110.

While it is preferred that the filters 50, 60 be removed from the facility 10 by an inverted bag process, it is understood by those skilled in the art that the liner 82 can be removed from the facility 10 in other manners. For instance, the filters 50, 60 could be removed by a standard bag-in bag-out process, as is well understood by those skilled in the art.

After the liner 82 has been removed from the facility 10, it is only necessary to decontaminate that portion of the facility which has been exposed to the hazardous materials. In this case, it is necessary to decontaminate the inner door of the pass through box 66. Such a small areas takes a relatively short time to decontaminate as compared to the entire enclosure work area 16. Once the inner door 72 has been decontaminated, a second new liner (not shown) can be placed within the enclosure work area 16 in the same manner as described above. This process can be continuously repeated as desired and/or needed.

While the foregoing embodiment has been described in connection with a half-suit 114 for accessing the enclosure work area 16, it is understood by those skilled in the art that any means could be utilized for accessing the work area 16 of the facility 10. For instance, standard gloves could be utilized, as is well understood by those skilled in the art. As mentioned above, while it is preferred that the liner 82 be double-walled to permit inflation, it is understood by those skilled in the art that a single-walled liner could be utilized without departing from the spirit and scope of the invention, such as with positive pressure systems, where it is not necessary that the liner have a significant amount of structural integrity.

From the foregoing description, it can be seen that the present invention comprises a facility for providing a sealed work area to handle, manipulate and formulate materials. It will be appreciated by those skilled in the art that changes can be made to the embodiment described above without departing from the broad inventive concept thereof. It is understood, therefore, that this invention is not limited to the particular embodiment disclosed, but it is intended to cover all modifications which are within the scope and spirit of the invention, as defined by the appended claims.

We claim:

1. A facility for providing a sealed work area to handle, manipulate and formulate materials, said facility comprising:

a walled enclosure having an interior periphery defining a work area, said enclosure including an inlet port for allowing air to flow into said enclosure work area and an outlet port for allowing air to flow out of said enclosure work area;

a replaceable liner positioned within said enclosure work area in facing relationship with said interior periphery to further define said enclosure work area, said liner including an inlet aperture in complementary sealed engagement with said inlet port and an outlet aperture in complementary sealed engagement with said outlet port, said liner being readily removable from said work area to be replaced with a second liner to facilitate decontamination of the work area; and flow control means for causing air to flow through said inlet port into said enclosure work area and out of said enclosure work area through said outlet port.

2. The facility as recited in claim 1 wherein said liner comprises:

a first flexible wall configured to generally complement the interior periphery of said enclosure work area;

a second flexible wall positioned inwardly of said first wall and in sealed engagement therewith to define an inflatable cavity therebetween; and valve means for selectively allowing a fluid to pass to and from said cavity whereby said liner has a first configuration wherein a first volume of fluid is positioned within said cavity to thereby inflate said liner to an expanded position which complements said interior periphery of said enclosure work area and a second configuration wherein a second volume of fluid is positioned within said cavity such that said liner is substantially deflated to a collapsed position which permits said liner to be removed from said enclosure work area through one of said ports and apertures.

3. The facility as recited in claim 2 wherein said enclosure and liner include worker access means for allowing a portion of a worker to access said enclosure work area.

4. The facility as recited in claim 3 wherein said worker access means comprises a worker access port in said enclosure and a worker access aperture in said liner in complementary sealed engagement with said worker access port for allowing the portion of the worker to access said enclosure work area through said worker access port and aperture and to permit said liner to be removed from said enclosure work area through said worker access port and aperture when said liner is in said second configuration.

5. The facility as recited in claim 1 wherein said enclosure and liner include worker access means for allowing a portion of a worker to access said enclosure work area.

6. The facility as recited in claim 5 wherein said worker access means comprises a worker access port in said enclosure and a worker access aperture in said liner in complementary sealed engagement with said worker access port for allowing the portion of the worker to access said enclosure work area through said worker access port and aperture.

7. The facility as recited in claim 6 wherein said worker access means further comprises suit means positioned within said work area in sealed engagement with said worker access port and aperture for permitting a worker to access said work area without being exposed to the materials.

8. The facility as recited in claim 7 wherein said liner further includes a secondary liner positioned over said suit means and in sealed engagement with said second flexible wall to prevent said suit means from being exposed to said enclosure work area.

9. The facility as recited in claim 1 further including quick-connect means for quickly connecting and disconnecting in sealed engagement said inlet and outlet apertures and said inlet and outlet ports, respectively.

10. A replaceable liner for a facility having a sealed work area to handle, manipulate and formulate materials, the facility including an enclosure having an interior periphery defining a work area, the enclosure having an inlet port for allowing air to flow into the enclosure work area and an outlet port for allowing air to flow from the enclosure work area and flow control means for causing air to flow through the inlet port into the enclosure work area and out of the enclosure work area through the outlet port, said liner comprising:

a first flexible wall configured to generally complement the interior periphery of the enclosure work area;

a second flexible wall positioned inwardly of the first wall and in sealed engagement therewith to define an inflatable cavity therebetween, said first and second walls including an inlet aperture for being placed in complementary sealed engagement with the inlet port and an outlet aperture for being placed in complementary sealed engagement with the outlet port; and valve means for selectively allowing a fluid to pass to and from said cavity whereby said liner has a first configuration wherein a first volume of fluid is positioned within said cavity to thereby inflate said liner to an expanded position which complements the interior periphery of the enclosure work area and a second configuration wherein a second volume of fluid is positioned within said cavity such that said liner is substantially deflated to a collapsed position which permits said liner to be removed from said enclosure work area through a port in said enclosure.

11. The liner as recited in claim 10 further including quick-connect means for quickly connecting and disconnecting in sealed engagement said inlet and outlet apertures and the inlet and outlet ports, respectively.

12. A method of lining a facility having a sealed work area to handle, manipulate and formulate materials, the facility includes an enclosure having an interior periphery defining a work area, the enclosure including an inlet port for allowing air to flow into the enclosure work area and an outlet port for allowing air to flow from the enclosure work area, said method comprising the steps of:

placing a liner within the enclosure work area;
positioning the liner in releasable complementary engagement with the interior periphery of the enclosure work area; and
removing the liner from the enclosure work area to decontaminate the work area after a process has been carried out therein.

13. The method as recited in claim 12, wherein the step of placing the liner within the enclosure work area comprises:

passing the liner through one of the ports into the enclosure work area.

14. The method as recited in claim 13 further comprising the steps of:

placing a second liner within the enclosure work area; and
positioning the second liner in releasable complementary engagement with the interior periphery of the enclosure work area.

15. The method as recited in claim 12 wherein the step of positioning the liner in engagement with the interior periphery of the work area comprises:
   introducing a fluid into a cavity of said liner to inflate the liner to an expanded position which complements the interior periphery of the enclosure work area.

16. The method as recited in claim 15 wherein the step of removing the liner comprises:
   allowing said fluid to pass from said cavity to substantially deflate the liner to a collapsed position; and
   removing the collapsed liner from the enclosure work area through a port in the enclosure.

* * * * *